US006748212B2

United States Patent
Schmutz et al.

(10) Patent No.: US 6,748,212 B2
(45) Date of Patent: Jun. 8, 2004

(54) METHOD AND APPARATUS FOR BACKHAUL LINK DIAGNOSTIC IN A WIRELESS REPEATER SYSTEM

(75) Inventors: Thomas R. Schmutz, Indialantic, FL (US); Michael A. Komara, Indialantic, FL (US)

(73) Assignee: Airnet Communications Corporation, Melbourne, FL (US)

( * ) Notice: Subject to any disclaimer, the term of this patent is extended or adjusted under 35 U.S.C. 154(b) by 446 days.

(21) Appl. No.: 09/736,031

(22) Filed: Dec. 13, 2000

(65) Prior Publication Data

US 2002/0028675 A1 Mar. 7, 2002

Related U.S. Application Data

(60) Provisional application No. 60/173,445, filed on Dec. 29, 1999.

(51) Int. Cl.⁷ .......................... H04B 7/14; H04B 17/00; H04Q 7/20
(52) U.S. Cl. ............... 455/424; 455/423; 455/422.1; 455/16; 455/67.11; 455/67.13
(58) Field of Search ................... 455/422.1, 423, 455/424, 445, 446, 447, 450, 454, 8, 9, 10, 13.1, 16, 501, 20, 24, 500, 522, 524, 63.1, 67.1, 67.13, 69, 67.14

(56) References Cited

U.S. PATENT DOCUMENTS

| | | | |
|---|---|---|---|
| 3,646,441 A | | 2/1972 | Magnuski |
| 5,953,637 A | * | 9/1999 | Coons et al. ............ 455/11.1 |
| 5,970,410 A | | 10/1999 | Carney et al. |
| 6,005,696 A | * | 12/1999 | Jpline et al. ............. 359/110 |
| 6,006,073 A | * | 12/1999 | Glauner et al. ........... 455/67.1 |
| 6,032,057 A | | 2/2000 | Kiiski |
| 6,088,570 A | * | 7/2000 | Komara et al. ........... 455/11.1 |
| 6,088,592 A | | 7/2000 | Doner et al. |
| 6,104,936 A | * | 8/2000 | Kronestedt ................ 455/562 |
| 6,253,060 B1 | * | 6/2001 | Komara et al. ............ 455/9 |
| 6,473,506 B1 | * | 10/2002 | Hook et al. ............... 379/279 |

* cited by examiner

*Primary Examiner*—William Trost
*Assistant Examiner*—Meless Zewdu
(74) *Attorney, Agent, or Firm*—Sacco & Associates, PA

(57) ABSTRACT

The invention discloses a method and apparatus for diagnosing a backhaul communications link between a repeater station and a base transceiver station of a wireless communication system. Adjacent and co-channel interference can severely degrade the performance of the backhaul communication link. As a result, the conditions on the backhaul link channels can be continually monitored to ensure optimal performance of the link.

Each RF channel on the backhaul communication link is individually diagnosed. A signal is then sent over the RF channel and the signal strength is measured along with any adjacent and co-channel interference. The measured statistics are then sent back to the base transceiver station.

In a further embodiment of the invention, the power level of a RF carrier signal on the backhaul communication link is measured and the carrier signal is then turned off. The power levels on the adjacent channels—above and below are then measured. Based on these measurements and other channel statistics, the power level of the RF carrier signal is accordingly adjusted.

12 Claims, 7 Drawing Sheets

METHOD AND APPARATUS FOR BACKHAUL LINK DIAGNOSTIC IN A WIRELESS REPEATER SYSTEM

CROSS REFERENCE TO RELATED APPLICATIONS

This application is related to and claims priority to U.S. Provisional Application Ser. No. 60/173,445 entitled "Backhaul Link Diagnostic System in a Wireless Repeater" filed Dec. 29, 1999, the entirety of which is incorporated by reference.

STATEMENT REGARDING FEDERALLY SPONSORED RESEARCH OR DEVELOPMENT (Not Applicable)

BACKGROUND OF THE INVENTION

1. Technical Field

This invention pertains generally to the field of wireless cellular communications. More particularly, the invention describes a method and apparatus for automatically diagnosing the backhaul link of a cellular system that uses RF repeaters.

2. Description of the Related Art

Conventional wireless cellular communications systems have a common architecture in which one or more defined cell sites are formed by the placement of one or more base transceiver stations within a geographic area. A cell site is typically depicted as a hexagonal area in which a transceiver is located such that a radio communication link can be established between the cellular system and a plurality of mobile stations within the defined geographic area for the cell.

In order to extend the coverage of conventional base transceiver station (BTS) systems over a larger geographical area, cell service providers have found it useful to employ translating repeaters. In the uplink direction, signals transmitted by a mobile station (mobile transceiver unit) located in a remote cell are received at the repeater, translated to a different carrier frequency, and then transmitted to the host BTS. Likewise, in the downlink direction, signals transmitted by the host BTS are received by the repeater, translated to a different carrier frequency, and then transmitted to mobile stations. The RF carrier link between the repeater and the BTS is known as the "backhaul channel," hereinafter, backhaul channel, and the carrier frequency on which the backhaul channel is operated is called the "backhaul frequency."

Some translating repeaters, such as the AirSite® repeater system offered by AirNet Communications Corporation of Melbourne, Fla., advantageously make use of existing inband RF carrier frequencies to backhaul cellular communications traffic. As used herein, the term "in-band" refers to carrier frequencies that are within the frequency spectrum allocation assigned to the service provider for providing cellular communications services to mobile subscribers. Use of in-band radio frequency channels to backhaul cellular communications traffic from remote repeater sites is highly advantageous as it eliminates costly wireline T1 or microwave connections.

Interference on the backhaul communications link can be caused by a variety of sources. As the number of subscribers on a cellular system grows, new equipment must be added in order to accommodate the increased usage. The addition of new repeaters in a repeater based cellular communications system can affect the performance of the backhaul communications link. In general, the link conditions can deteriorate due to congestion as the link reaches its full capacity. In addition to more traffic traversing the link, differences in tolerances between the various network entities accessing the bus can also degrade the backhaul communications link.

Interference on the backhaul link can be a problem for several reasons. For example, since the repeater station recovers its clock from the downlink channel of the backhaul communications link, the signals on the backhaul link must be maintained at a certain quality in order for the repeater station to maintain synchronization with the base station. Additionally, the slot/frame timing information for the downlink signal is derived as an offset to the uplink signal. Accordingly, interference on the backhaul communications link can adversely affect the uplink timing. Finally, the bit error rate (BER) can be adversely affected by any interference on the backhaul communications link.

The backhaul communications link can be diagnosed in a variety of ways. For example, a technician can use test equipment to determine the conditions that exist on the communications link. Alternately, loopback testing for diagnosing the link can be used. However, these systems are not completely satisfactory for testing the backhaul communication link of a repeater based system. For example, manual testing can be expensive and time consuming. By comparison, loopback systems are more convenient and less expensive, but are best used when testing the complete transmit and receive communication path through which a signal must travel.

In particular, in order to accurately test the conditions on the RF channel comprising the backhaul communication link, the uplink and downlink transmission paths on the link must be tested independent of the internal path of the repeater system. If a loopback test was employed to test the backhaul communication, then the link statistics would be corrupted by any processing internal to the repeater system. For this reason, loopback systems suffer certain drawbacks for testing the backhaul communication link.

SUMMARY OF THE INVENTION

The invention concerns a method for diagnosing a backhaul communication link of a repeater based wireless communication system. The wireless communication system has a base station located within a home cell, and a plurality of substantially adjacent cells, at least one of the plurality of cells having a repeater station located therein. The method comprises automatically measuring an interference level for the backhaul communication link and responsive to the measured interference level, selectively modifying the operation of the backhaul link to overcome any adverse effect of the interference level. The modifying step can comprise one or more of increasing a power level of signals transmitted over the backhaul link, decreasing the power level of signals transmitted over the backhaul link, assigning an alternative frequency for use as the backhaul link, or sending a message to an operation maintenance center.

The measuring step can comprise automatically measuring the interference level on an RF carrier frequency of a backhaul channel assigned for the backhaul communications link. The measuring step can also include automatically measuring the interference level on one or more RF channels adjacent to the RF carrier frequency of the backhaul channel. Further, the measuring step can include disabling signal transmissions on the backhaul channel and measuring signal levels of noise or interfering signals occurring on the RF carrier frequency of the backhaul channel. Finally, the measuring step further comprises transmitting a test signal on the RF carrier frequency of the backhaul channel and measuring an adverse effect of one or more of a noise level and an interfering signal level on the test signal. The adverse effects of noise or interference on the channel can be measured by determining at least one of a carrier-to-noise level, a carrier-to-interference level, a bit error rate, or a block error rate. The measuring step can be performed at predetermined intervals, upon detection of a predetermined number of detected bit errors, upon detection of a predetermined number of detected block errors, or upon detection of a predetermined number of frame erasures.

In a further embodiment of the invention, a system is provided for diagnosing a backhaul communication link of a repeater-based wireless communication system. The system includes a base station located within a home cell, and a plurality of substantially adjacent cells, one or more of which can include a repeater station located therein. The system comprises circuitry and/or software for automatically measuring an interference level for the backhaul communication link. Such measurements can include automatically measuring the interference level on an RF carrier frequency defining a backhaul channel assigned for the backhaul communications link and automatically measuring the interference level on at least one RF channel adjacent to the backhaul channel. The measurements can also include disabling signal transmissions on the backhaul channel and measuring at least one of a noise level and an interfering signal level. Finally, the measurements can include transmitting a test signal on the backhaul channel and measuring any adverse effect of noise or interfering signals on the test signal. Control circuitry and software is also provided so that a transmitter connected to the backhaul communications link can be selectively controlled to modify the operation of the backhaul communication link to overcome any adverse effect of the interference level. This modification can include an increase in power level of signals transmitted over the backhaul link, a decrease in power level of signals transmitted over the backhaul link, the assignment of an alternative frequency for use as the backhaul link, and/or a message being sent to an operation maintenance center.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE INVENTION

Figure 1:
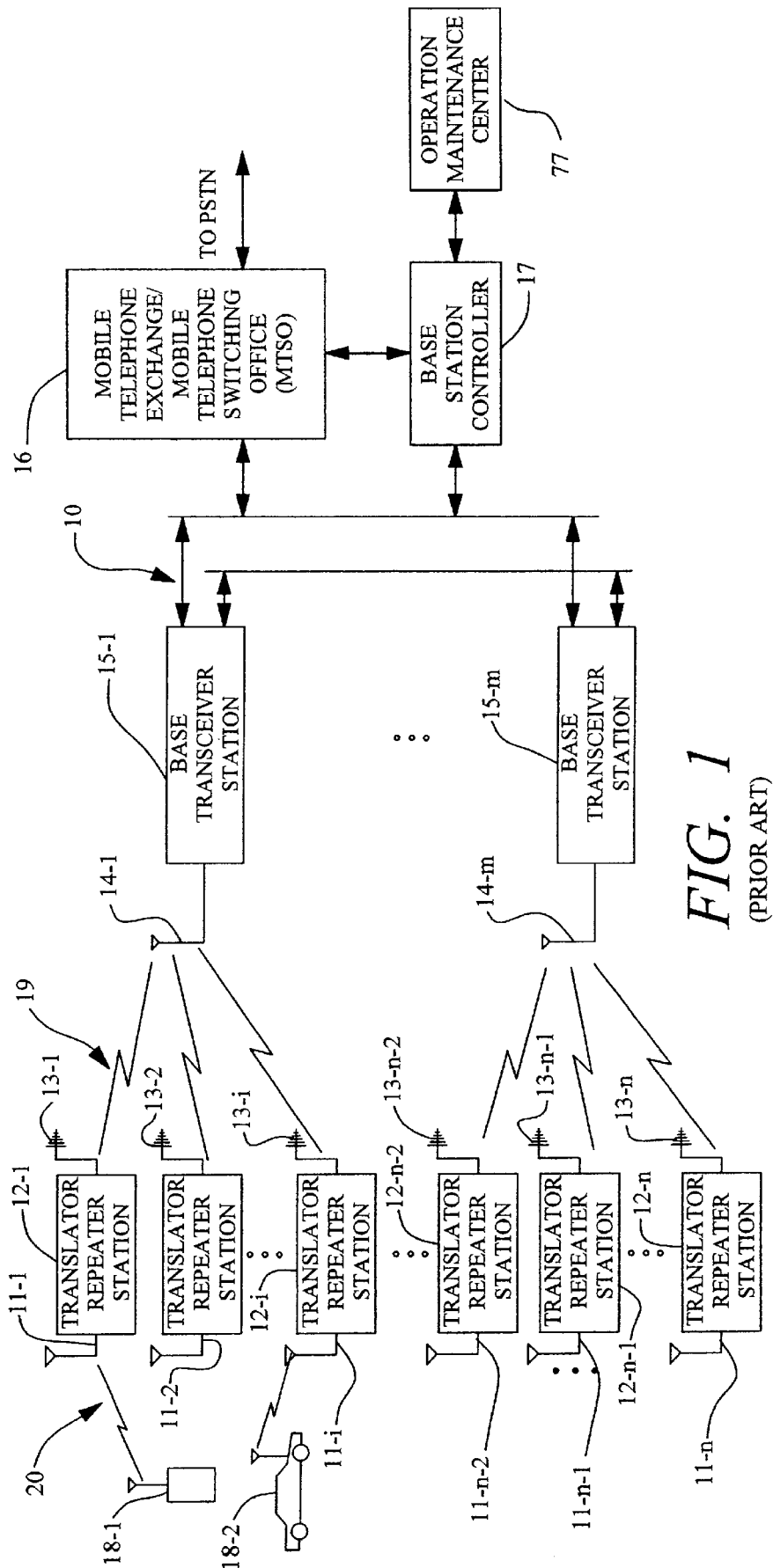
FIG. 1 is a block diagram of a wireless communications system employing wireless translator/repeater stations.

FIG. 1 is a block diagram of a conventional wireless communications system such as a Personal Communication System ("PCS") or other similar system. In this system, single-omni directional type wireless translator repeaters are deployed in peripheral cells of a cell cluster to concentrate radio signal traffic to and from a broadband base transceiver station ("BTS"). Those skilled in the art will readily appreciate that sectorized wireless translator repeaters can also be used for this purpose. However, for convenience, the system will first be described relative to the single-omni directional type translator system.

The system 10 can include repeater omni-directional antennas 11-1, 11-2, . . . 11-$i$, . . . 11-$n$-2, 11-$n$-1 and 11-$n$ (collectively omni-directional antennas 11), translator repeater stations 12-1, 12-2, . . . 12-$i$, . . . 12-$n$-12-$n$-1 and 12-$n$ (collectively repeaters 12), repeater directional antennas 13-1, 13-2, . . . 13-$i$, . . . 13-$n$-2, 13-$n$-1 and 13-$n$ (collectively repeater directional antennas 13), BTS omni-directional antennas 14-1, . . . 14-$m$ (collectively BTS antennas 14), and broadband base transceiver stations 15-1, . . . 15-$m$ (collectively BTS's 15). System 10 can further include mobile telephone exchange 16 (MTSO), one or more base station controllers 17, and a plurality of mobile subscriber units 18-1 and 18-2 (collectively mobile units 18). Repeaters 12 conventionally receive radio signals from mobile units 18 through omni-directional antennas 11 and forward them to BTS's 15 through repeater directional antennas 13. Likewise, radio signals transmitted from BTS's 15 through BTS antennas 14 are forwarded by repeaters 12 to mobile units 18. BTS's 15 are responsible for demodulating signals received from repeaters 12 through BTS antennas 14 and connecting these signals to the Public Switched Telephone Network ("PSTN") through MTSO 16. In addition, BTS's 15 modulate signals received from the PSTN (not shown) through MTSO 16 to format them for transmission through BTS antennas 14 to repeaters 12.

Figure 1A:
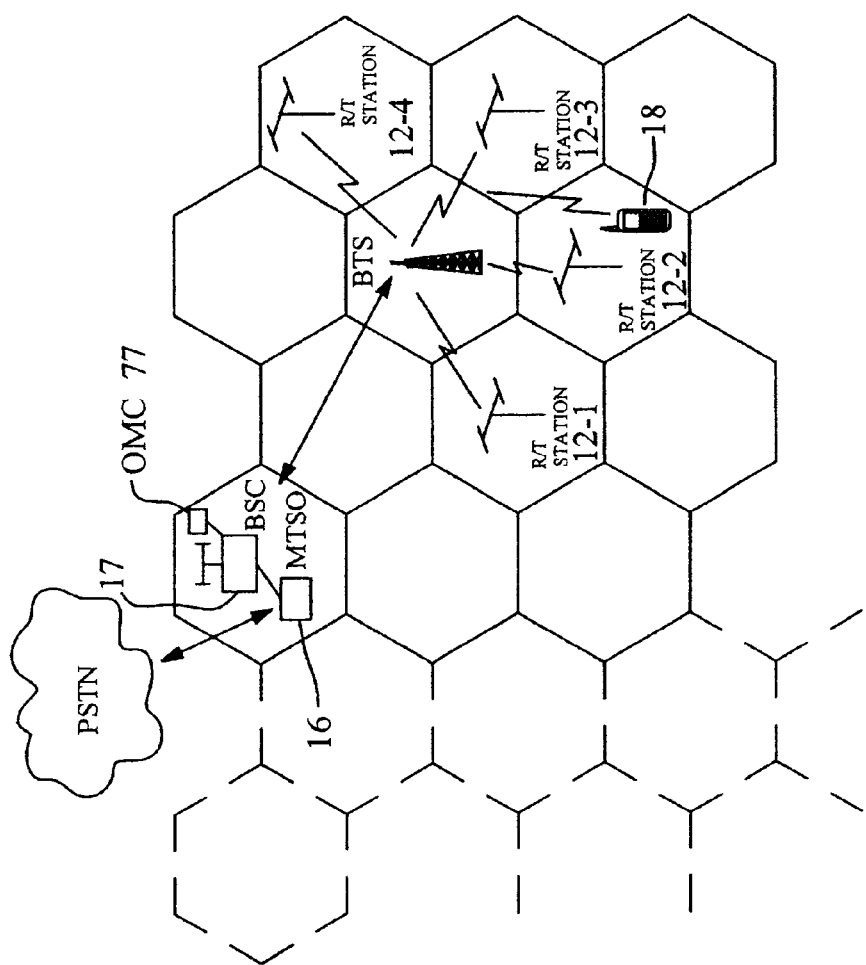
FIG. 1A is a block diagram of a wireless communications system as in FIG. 1, illustrating the cell structure and possible proximity of the various entities.

FIG. 1A shows the wireless communications system as in FIG. 1, illustrating the cell structure and possible proximity of the various entities. It should be readily understood that FIG. 1A is exemplary and as such, many other configurations with the various entities co-located in one or a plurality of cells are possible.

Figure 2:
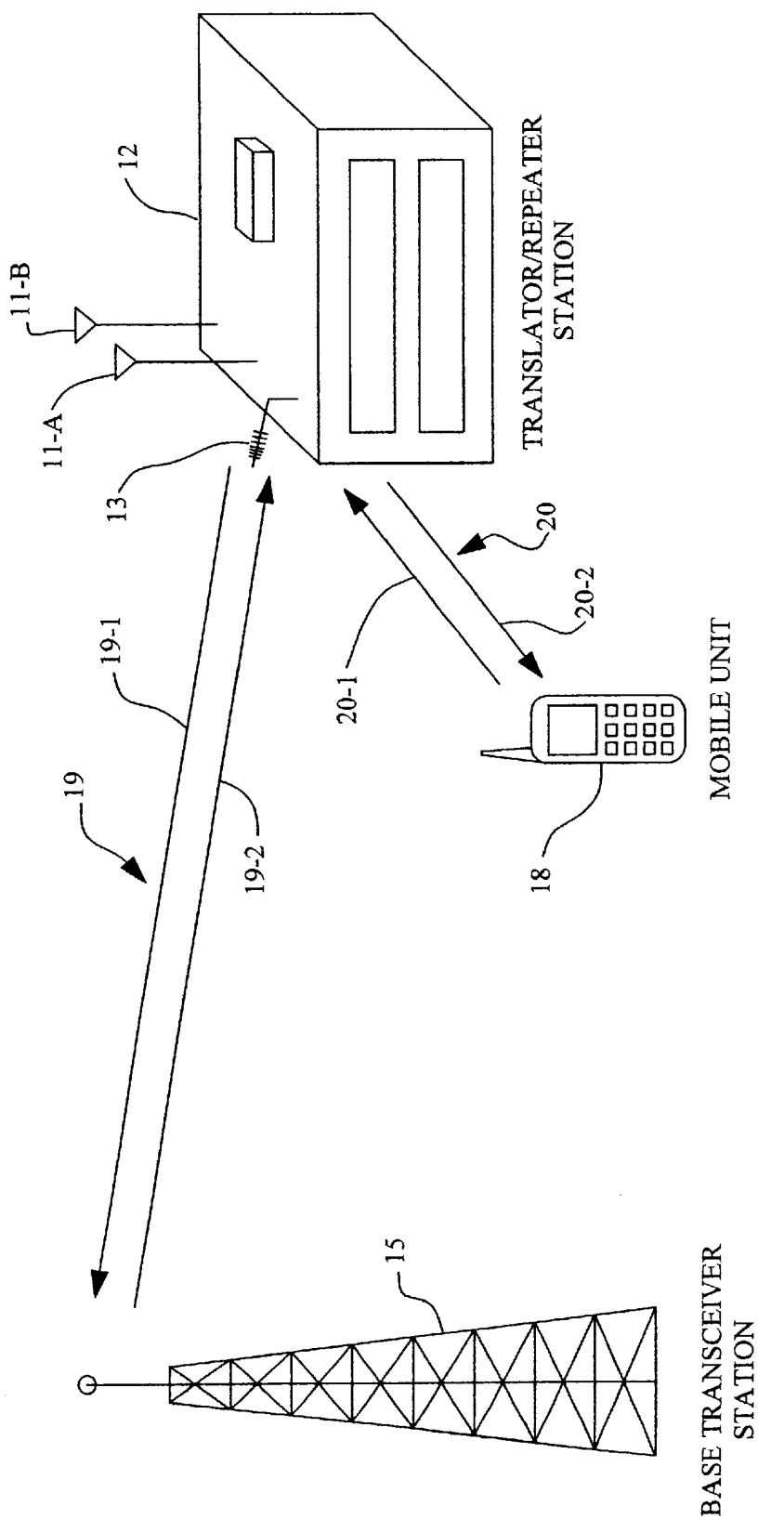
FIG. 2 is an exemplary arrangement of the wireless communications system of FIG. 1 showing how wireless links are deployed through the wireless translator/repeater.

FIG. 2 illustrates the basic operation of a repeater 12. In particular, repeater 12 transmits signals to and receives signals from BTS 15 through backhaul channel 19. Similarly, repeater 12 transmits signals to and receives signals from mobile unit 18 through ground link channel 20. Each of the ground link channel 20 and the backhaul channel 19 is defined by an uplink carrier frequency and a downlink carrier frequency. Because BTS 15 is stationary, repeater 12 preferably employs directional antenna 13 to transmit and receive signals over backhaul channel 19. In contrast, because mobile units 18 are not stationary and the repeater 12 is not sectorized, repeater 12 preferably employs one or more omni-directional antennas 11A and 11B respectively to transmit and receive signals over ground link channel 20.

Communications between mobile units 18, repeaters 12, and the BTS 15 can be performed using a variety of multiplexing schemes that are well known in the art. For example, a time division multiplex access (TDMA) scheme may be used for this purpose.

Figure 3:
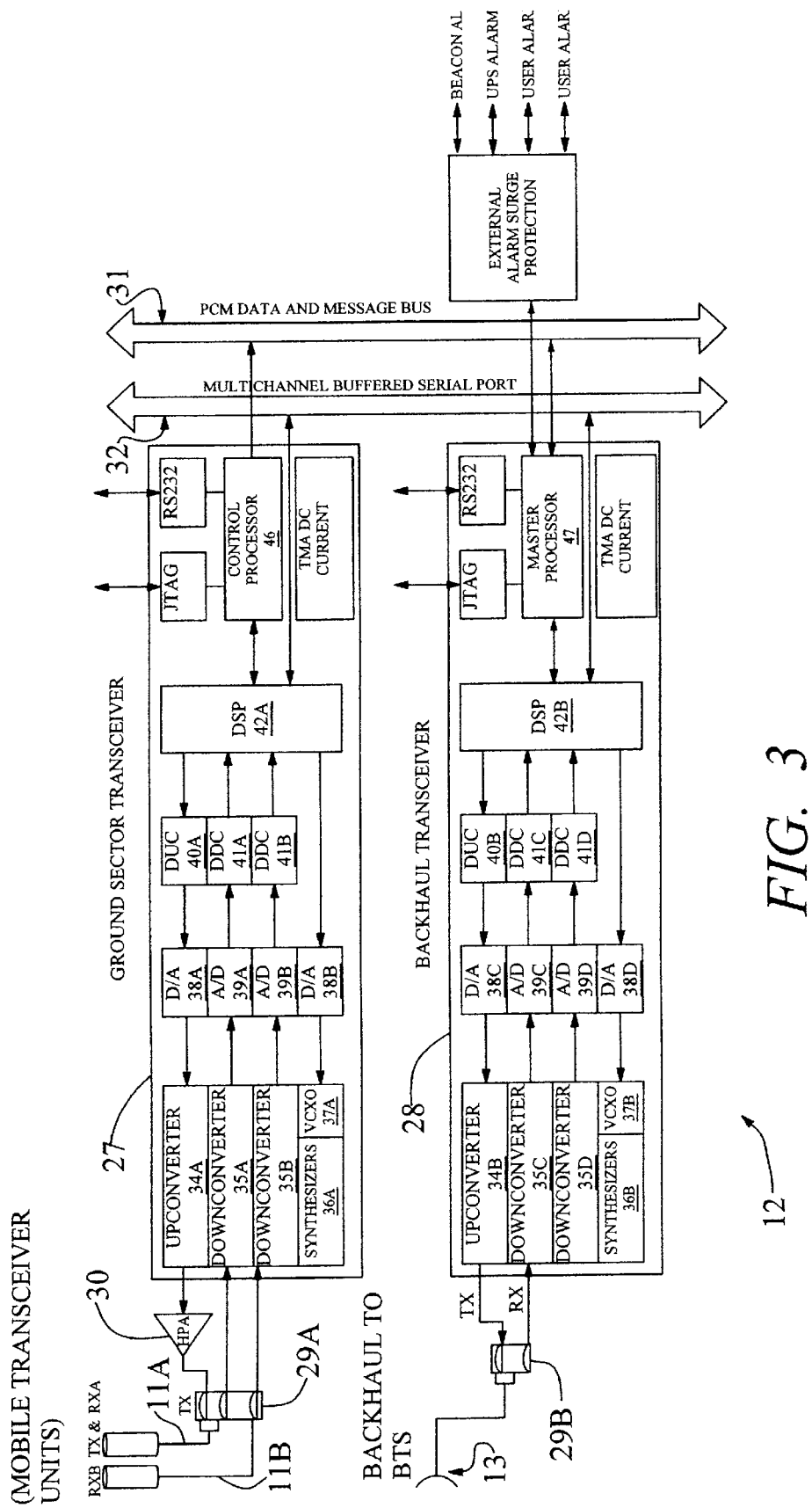
FIG. 3 is a block diagram of an exemplary single-omni directional type translator repeater station of the type shown in the wireless communication system of FIG. 1.

FIG. 3 is a detailed block diagram block of a repeater 12 that can be used in connection with the present invention. The repeater 12 can comprise a ground sector transceiver 27 and backhaul transceiver 28. It will readily be appreciated by those skilled in the art that the particular transceiver architecture shown is not critical to the invention and the invention as described herein is not intended to be so limited.

In a preferred embodiment, transceivers 27 and 28 are each capable of transmitting and receiving over a broad range of carrier frequencies allocated to a service provider for multi-carrier operation. However, the invention is not limited in this regard and more narrowbanded transceivers can also be used for the purposes of the present invention. Each transceiver 27, 28 is preferably configured so that its operation can be controlled by control processing and master processor 46 and 47, respectively.

FIG. 3 shows a single sector omni directional-type wireless repeater system, it being understood that the invention is not so limited. In fact, a variety of sectorized repeaters can also be used for this purpose. Signals from a mobile unit 18 are received at omni-directional antennas 11A and/or 11B attached to ground sector transceiver 27. These signals are encoded and transmitted by mobile unit 18 using a standard wireless telephony format such as GSM and typically range in power from between about −111 to −25 dBm. The signal passes through cavity filter 29A on to downconverter 35A or, alternatively, 35B where, in conjunction with synthesizer module 36A and voltage-controlled crystal oscillator 37A, the signal is mixed down to intermediate frequency or IF. A high-speed analog-to-digital converter 39A (or 39B) then converts the analog IF signal into a digital signal. Once the IF signal is digitized, digital downconverter 41A (or 41B) translates the signal down to complex baseband. Digital downconverter 41 preferably provides the ability to downconvert, decimate, filter, and control the gain of the signal. After being converted to complex baseband, the signal is demodulated by digital signal processor 42A. Digital signal processor 42A is configured for decoding the received signal data from the standard wireless telephony format, such as GSM, to a common format used internally within the repeater 12.

The common format data is then transferred to digital signal processor 42B in the backhaul transceiver 28 over multi-channel buffered serial port 32. Subsequently, the signal is re-modulated by digital signal processor 42B. The re-modulated signal is output as a complex baseband signal and translated to real IF by digital upconverter 40B. After the signal is translated to real IF, digital-to-analog converter 38C converts the signal back to an analog signal where it is mixed by upconverter 34B in conjunction with synthesizer module 36B and voltage-controlled crystal oscillator 37B. Now ready to be broadcast, the signal passes through amplifier and cavity filter 29B and is transmitted through the backhaul channel to the BTS through repeater directional antenna 13.

The transceivers 27 and 28 are preferably controlled by one or more control circuits. The control circuits can be in the form of a general purpose computer interfaced with the transceiver, a programmable microprocessor integrated with the transceivers with appropriate software, a hardware based controller, or any other combination of microprocessors, electronic circuitry and programming as may be necessary or appropriate for controlling the first and second transceivers.

As shown in FIG. 3, the control circuits include master processor 47 and control processor 46. Master processor 47 preferably controls the operation of backhaul transceiver 28, including selection of transmit and receive frequencies. Master processor 47 is also linked with PCM data and message bus 31 so that it can communicate with control processor 46, and vice versa. Control processor 46 is preferably a slave processor controlled by master processor 47. Control processor 46 can also preferably control the operation of ground sector transceiver 27, including selection of transceiver receive and transmit frequencies.

Translation of the downlink signals transmitted from BTS 15 through the backhaul channel is similar to the procedure employed to translate signals transmitted from the mobile units. Specifically, a downlink signal, preferably at −70 dBm but typically ranging anywhere from −111 dBm to −25 dBm, is received from a BTS 15 at repeater directional antenna 13 attached to backhaul transceiver 28. The signal passes through cavity filter 29B to downconverter 35C where, in conjunction with synthesizer module 36B and voltage-controlled crystal oscillator 37B, the signal is mixed down to IF. Analog-to-digital converter 39C converts the analog IF signal to a digital signal where it is subsequently processed by digital downconverter 41C to complex baseband.

Once converted into complex baseband, the signal is demodulated by digital signal processor 42B and transferred to digital signal processor 42A over multi-channel buffered serial port 32. The signal is then re-modulated by digital signal processor 42A and translated from complex baseband to real IF by digital upconverter 40A. After the signal is translated to real IF, digital-to-analog converter 38A converts the signal back to an analog signal. Upconverter 34A, synthesizer 36A, and voltage-controlled crystal oscillator 37A operate together to mix the signal for transmission. The signal is then amplified by high-power amplifier 30, filtered by cavity filter 29A and transmitted from omni-directional antenna 11A to the mobile unit through the ground link channel.

Figure 4:
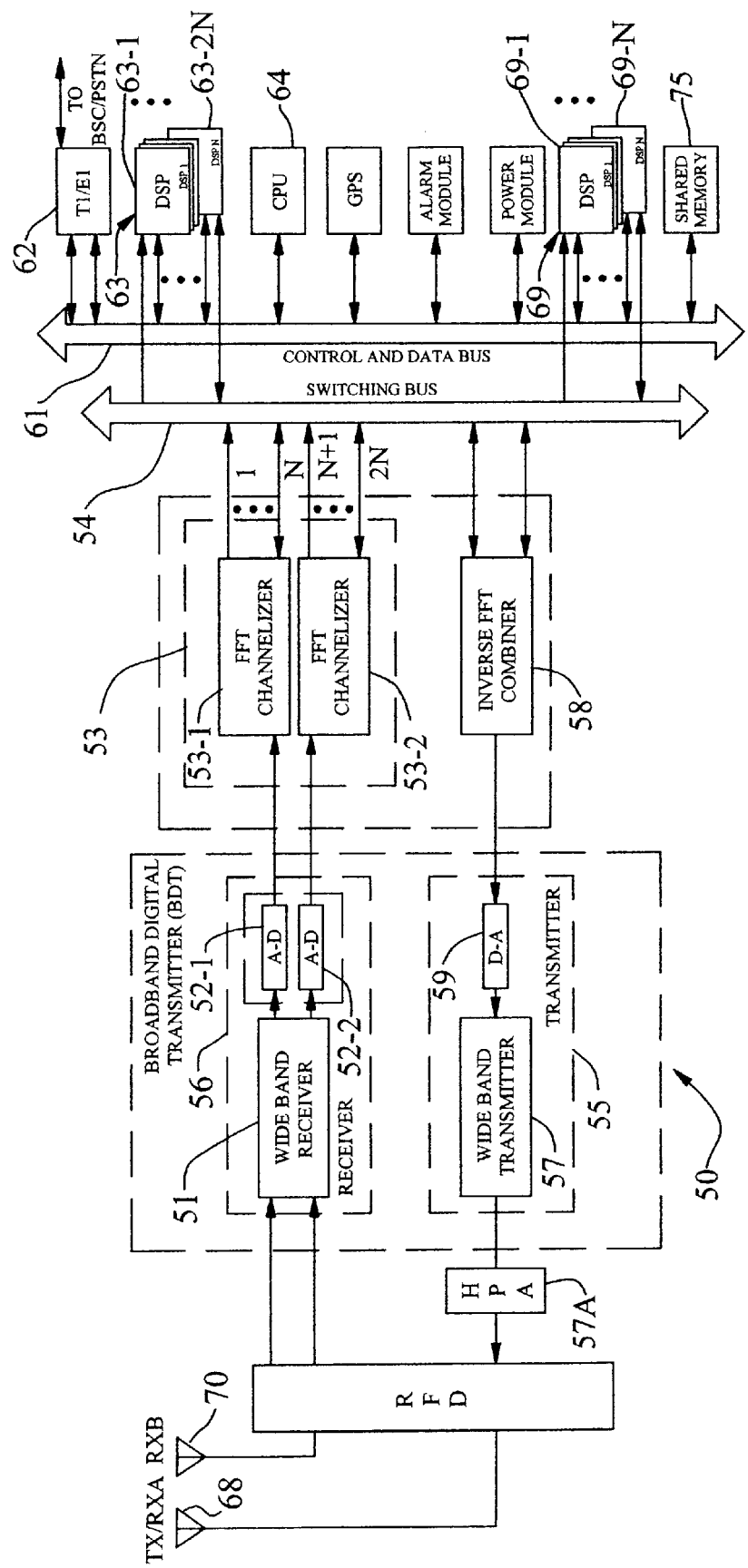
FIG. 4 is a block diagram of an exemplary base transceiver station of the type shown in the wireless communication system of FIG. 1.

Referring now to FIG. 4, a broadband BTS 15 is illustrated, which comprises a receiver section 56 and a transmitter section 55. It will be readily appreciated by those skilled in the art that the particular transceiver architecture shown is not critical. Accordingly, the invention disclosed herein is not intended to be so limited. Receiver section 56 preferably includes antennas 68, 70 and a wideband receiver 51 capable of receiving a plurality of carrier frequency channels. Signals from the received channels can include new power requests, power adjustment requests and traffic channel data from mobile transceiver units. The term "wideband," as used herein, is not limited to any particular spectral range, and it should be understood to imply a spectral coverage of multiple frequency channels within the communication range over which a wireless communication system may operate (e.g. 5 or 12 MHz). Narrowband, on the other hand, implies a much smaller portion of the spectrum, for example, the width of an individual channel (e.g. 200 or 30 kHz).

The output of the wideband receiver 51 is down-converted into a multi-channel baseband signal that preferably contains the contents of all of the voice/data carrier frequency channels currently operative in the communication system or network of interest. This multichannel baseband signal is preferably coupled to high-speed A-D converters 52-1 and 52-2 operating in parallel for diversity receive capability. Where no diversity capability is required, a single A-D 52-1 could be utilized. Additionally, more than one parallel leg may be required for sectorized applications. Hence, it should readily be appreciated by one skilled in the art that the presence of a second parallel processing leg is not intended to be a limitation on the instant invention. The dynamic range and sampling rate capabilities of the A-D converter are sufficiently high (e.g. the sampling rate can be on the order of 25 to 50 Mega-samples per second (Msps)) to enable downstream digital signal processing (DSP) components, including Discrete Fourier Transform (DFT) channelizers 53-1 and 53-2, to process and output each of the active channels received by receiver 56.

The channelized outputs from the A-D converters are further processed to extract the individual channel components for each of the parallel streams. FFT channelizers 53-1 and 53-2 extract from the composite digitized multichannel signals, respective narrowband carrier frequency channel signals. These narrowband signals are representative of the contents of each of the respective individual carrier frequency communication channels received by the wideband receiver 51. The respective carrier frequency channel signals are coupled via N output links through a common data bus 61 to respective digital signal processing receiver units 63-1 . . . 63-2N, each of which demodulates the received signal and performs any associated error correction processing embedded in the modulated signal. In the case where the received signals are destined for the PSTN, these demodulated signals derived from the digital signal processing receiver units 63 can be sent via a common shared bus 54 to a telephony carrier interface, for example, T1 carrier digital interface 62, of an attendant telephony network (not shown).

The transmitter section 55 includes a second plurality of digital signal processing units, specifically, transmitter digital signal processing units 69-1 . . . 69-N, that are coupled to receive from the telephony network respective ones of a plurality of channels containing digital voice/data communication signals to be transmitted over respectively different individual carrier frequency channels of the multichannel network. Transmitter digital signal processing units 69 modulate and perform pre-transmission error correction processing on respective ones of the plurality of incoming communication signals, and supply processed carrier frequency channel signals over the common bus 54 to respective input ports of an inverse FFT-based multichannel combiner unit 58. The combiner 58 outputs a composite multichannel digital signal. This composite signal is representative of the contents of a wideband signal, which contains the respective narrowband carrier frequency channel signals output from the digital signal processing transmitter units 69. A composite signal generated from the output of the multichannel combiner unit 58 is then processed by the digital-to-analog (D-A) converter 59. The output of D-A converter 59 is coupled to a wideband (multicarrier) transmitter unit 57, which can include or have a separate multi-carrier high power amplifier (HPA) 57A. The transmitter unit 57 transmits a wideband (multicarrier) communication channel signal defined by the composite signal output of the inverse fast Fourier transform-based combiner unit 58. The output of the HPA 57A is then coupled to antenna 68 for transmission.

A central processing unit (CPU) controller 64 is provided for coordinating and controlling the operation of BTS 15. For example, the CPU 64 can include a control processing unit, memory and suitable programming for responding to transmit power control requests received from mobile transceiver units. CPU 64 can selectively control transmit power levels of each TDM communication channel on a timeslot-by-timeslot basis. The CPU 64 may be a microprocessor, DSP processor, or micro controller having firmware, software, or any combination thereof.

DSPs 63 can extract information from each of the narrowband carrier frequency channel signals. Information for each of these channels can be stored in shared memory 75 through the common control and data bus 61. CPU 64, under firmware and/or software control, can then access the shared memory 75 through bus 61. For example, control channel data concerning a particular downlink or control channel can be received at antenna 70 from a repeater station through a backhaul communication link. After the information for each channel in the received signal is processed and separated, DSPs 63 can store the control channel data in the shared memory 75. CPU 64 can then access shared memory 75 to retrieve the control channel data. CPU 64, under software and/or firmware control, can then use this data, for example, as an input to a control algorithm. The output from the algorithm can be stored in shared memory 75 for later use.

Figure 5:
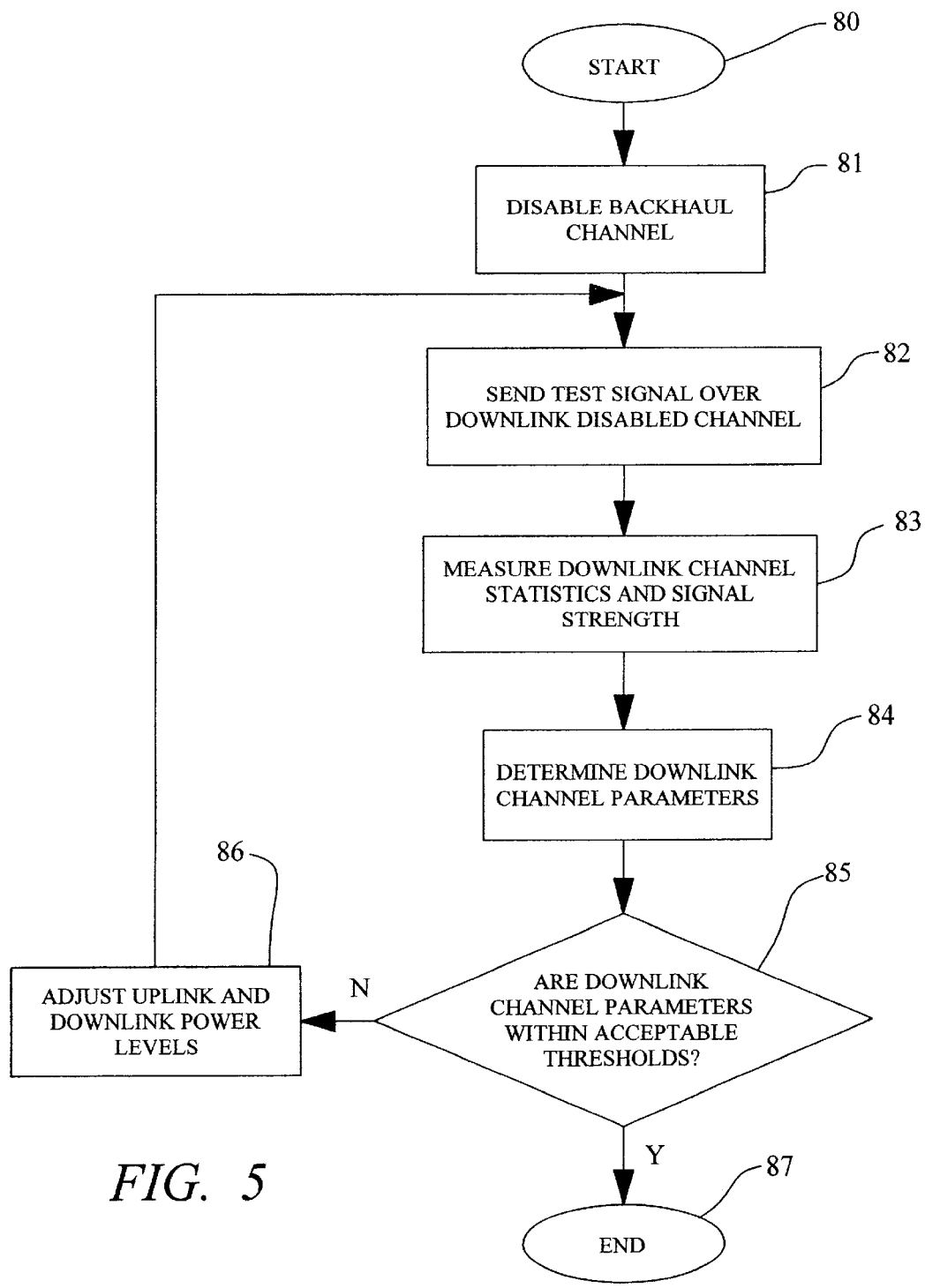
FIG. 5 is an exemplary flow chart illustrating the steps that can be used to diagnose the backhaul communications link.

Referring now to FIG. 5, an illustrative flow diagram of exemplary steps used to diagnose the backhaul communications link is shown. For convenience, the inventive arrangements shall be described herein relative to the testing of a downlink channel, it being understood that the uplink channel can be similarly tested. This process can be controlled by the CPU 64. The diagram starts with step 80, followed by step 81, wherein the BTS, for example BTS 15-1, can disable normal backhaul transmissions on a particular backhaul RF carrier channel in order to run the diagnostic. This is achieved by preventing the BTS transmitter from transmitting at that particular RF frequency. The repeater can be notified that the channel will be taken out of service in order to ensure graceful termination of any communication session that is in progress.

Once the RF carrier channel is disabled, then traffic will be prevented from accessing the channel. If available, an alternative redundant RF channel can be temporarily used for the backhaul link. The BSC 17 or the BTS 15 will preferably mark a particular backhaul channel as being out-of-service to ensure that it is not allocated for traffic use.

In step 82, a downlink test signal can be sent over the disabled channel from the base transceiver station, for example 15-1, to a repeater 12, for example 12-1. The signal strength of the test signal and other channel statistics measured at the repeater station 12-1 are subsequently reported to the base transceiver station 15-1. These can include the noise and interference levels from co-channel and adjacent channel sources.

In step 84, the downlink channel parameters such as the frame erasure rates (FER), the carrier-to-noise (C/N) and carrier-to-interference (C/I) ratio are determined based on the values measured in step 83. The methods used to determine the FER, C/N and C/I are well known by those skilled in the art. A bit error rate (BER) and/or a block error rate (BLER) may also be determined from the test signal. Frame erasure rates (FER) which provides an indication of the speech signal that is missing due to lost packets or frames can also provide insight into the interference levels that exist on the backhaul link. Once the downlink channel parameters, for example, FER, C/N, and the C/I are determined, then the uplink and downlink channels can be accordingly adjusted to mitigate adverse effects such as noise and interference as shown in step 85.

A process similar to that described in FIG. 5 can similarly be used for testing the uplink channel. In that case, it may be desirable for the process to be controlled by master processor 47 or control processor 46. Test signals would preferably be sent from the repeater 12 to the BTS 15.

According to a preferred embodiment of the invention, the uplink and downlink power level used for communicating signals on the backhaul channel can be increased or decreased by transceiver master processor 47 according to predefined FER, C/N, and C/I thresholds. In step 85, if the FER, C/I and/or C/N are not within acceptable thresholds, the power levels on the uplink and downlink are adjusted in step 86 to mitigate any adverse effects on the channel. If the C/I and C/N are within acceptable thresholds, then the diagnostic ends at step 87. For example, if the C/I on the backhaul communication link is greater than a predefined threshold of 18 Decibels (dB), then the power level is acceptable and there is no need to adjust the power level. If the C/I is less than the predefined threshold of 18 dB and/or the C/N is less than a predefined threshold of 18 dB, then the power level on the backhaul link can be accordingly adjusted by master processor 47 in an attempt to attain an acceptable C/I ratio greater than 18 dB.

In accordance with a further aspect of the invention, the diagnostic test may be run periodically as part of a diagnostic routine, such as in off-peak hours when load on the system is minimal. Alternately, the diagnostic may be run whenever the link statistics such as the Bit Error Rate (BER) or Block Error Rate (BLER) exceed certain thresholds. Since BER and BLER are routinely monitored by the BSC 17, the master processor 47 can routinely request these values from the BSC 17. Hence, whenever the main processor 47 receives and compares the received BER or BLER to a predetermined threshold and the threshold is exceeded, the processor 47 can then initiate the diagnostic routine.

Instead of, or in addition to adjusting the power as in step 86, an alarm condition could be set if certain channel statistics fall outside of predetermined ranges. The alarm condition could be designed so that a system operator could be warned of the condition. The alarm could alert and cause an operator at the Operation and Maintenance Center (OMC) 77 to manually remove the link from service and run the diagnostic. Dependent on the link conditions, it might be necessary to remove the link temporarily from service and use a spare RF carrier channel as a replacement. In this case, the BSC 17 can change the channel status from marked as out-of-service, to being marked as bad. The selection of the spare RF channel could be performed manually by the operator. In a preferred embodiment however, the spare RF channel can be automatically selected for use by the backhaul link if power adjustments in step 86 prove insufficient to eliminate the effects of noise or interference.

It should be readily understood by one skilled in the art that although the uplink and downlink power levels can be adjusted according to measurements taken on the downlink channel of the backhaul link, both the uplink and the downlink power levels do not have to be so adjusted. While adjustment of the downlink power level is advantageous, adjustment of the uplink power based on measurements taken on the downlink channel alone are at best, a mere representation of the reciprocal path loss. Hence, factors such as uplink co-channel interference are not taken into account when the uplink power is adjusted based on the downlink channel measurements.

In a further embodiment of the invention, various power levels on the uplink and downlink RF carrier frequency for the backhaul communications link as well as respective adjacent channels can be monitored. In particular, the noise power level and the power level of interfering signals can be measured. These interfering signals might be from adjacent channels, co-channel, or due to various types of noise. Accordingly, the conditions on the uplink and downlink RF carrier channel of the backhaul communication link can be diagnosed by comparing these various power levels with and without transmission on the backhaul channel. For convenience, the process according to the inventive arrangements shall be described relative to the downlink carrier frequency. However, it should be understood that the method can also be used in connection with the uplink carrier frequency. In this regard, it is noted that the backhaul channel is comprised of a pair of carrier frequencies, one for uplink transmission and the other for downlink transmission.

Figure 6:
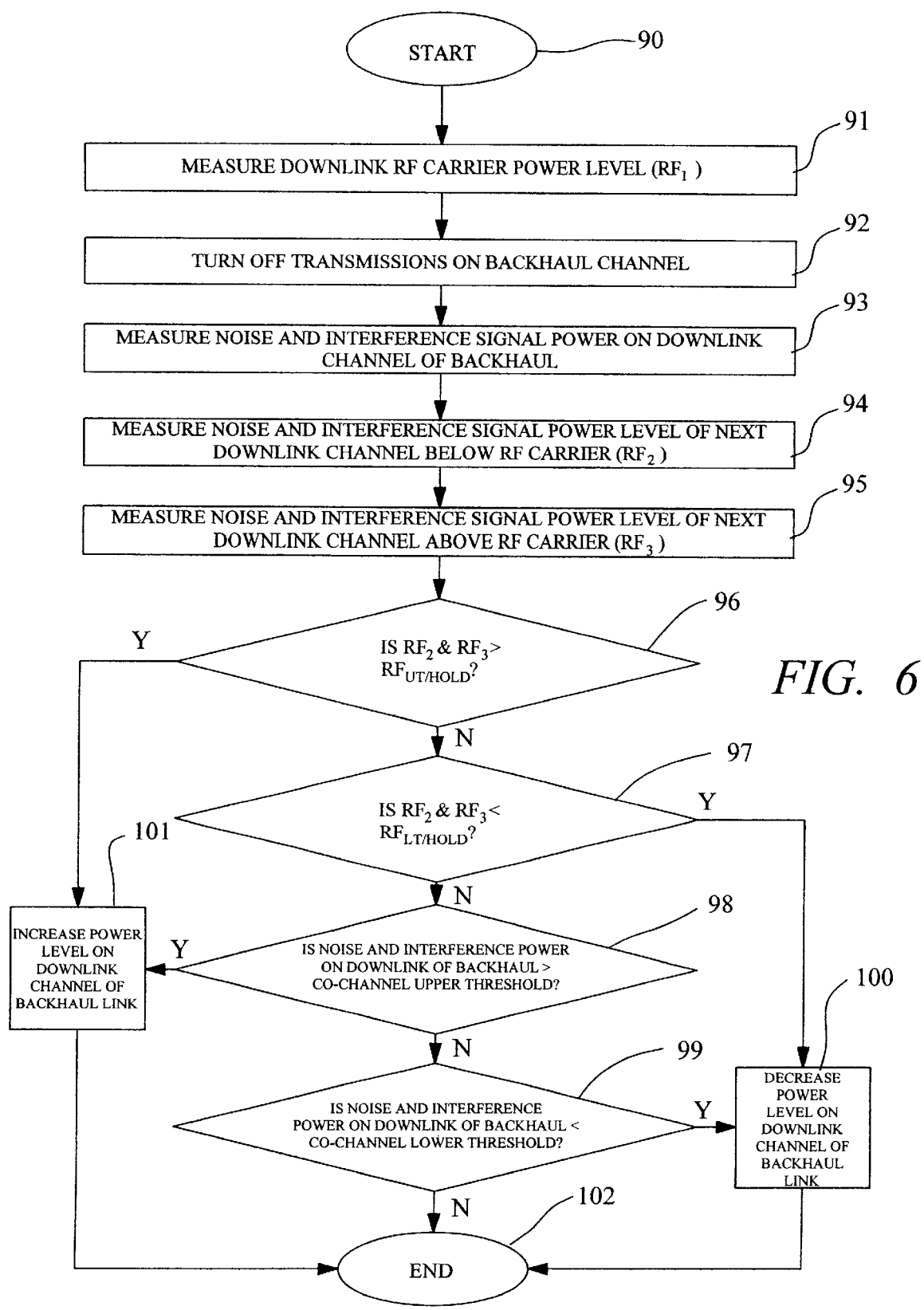
FIG. 6 is illustrates an exemplary alternative embodiment of the invention.

Referring now to FIG. 6, the method starts at step 90 followed by the measurement of the downlink RF carrier power level ($RF_1$) in step 91. This measured downlink carrier power level is the power level as received at the repeater station. This signal may be a special test signal or a signal being used for communication. The measured carrier power level $RF_1$ is used as a reference power level. In step 92, following the measurement of the downlink RF carrier power, the RF carrier is disabled by BTS master processor 47. The noise and interference signal power level on the downlink of the backhaul channel is then measured as illustrated in step 93. Although the measurement can be taken at the BTS, the invention should not be so limited. For example, measurements could be taken anywhere along the downlink path using suitable test instruments. According to a preferred embodiment, the measurements can be made at the repeater station 12 and reported back to the BTS 15. Measurements taken at the repeater station give the best indication of the noise and interference levels to which the repeater station 12 may be subjected.

In steps 94 and 95, the RF carrier levels on the downlink channels adjacent to the backhaul channel are measured, for example, at the BTS 15 or at the repeater 12. Thus, for example, in a GSM based system, the RF carrier power ($RF_2$) can be measured in step 94 for a channel that is 200 kHz below $RF_1$, or the next lower downlink channel to $RF_1$. Similarly, in step 95, the RF carrier power ($RF_3$) is measured for a downlink channel that is 200 kHz above $RF_1$, or the next higher channel to $RF_1$.

In step 96, the measured carrier power for the adjacent downlink channels are compared to upper and lower power thresholds, $RF_{UT/hold}$ and $RF_{LT/hold}$ defined by $RF_1$. For example, the thresholds can be predefined to be ±9 dBm above and below the measured $RF_1$ value. Thus, if $RF_1$ is −70 dBm, then $RF_{UT/hold}$ would be −61 dBm and $RF_{LT/hold}$ would be −79 dBm.

Returning to step 96, the power level for the lower RF carrier $RF_2$ and RF carrier $RF_3$ are compared to the predefined threshold, $RF_{LT/hold}$. If $RF_2$ or $RF_3$ is greater than the upper threshold $RF_{UT/hold}$, then the downlink power level on the backhaul channel can be increased as in step 101. Otherwise, the carrier power lever for the higher adjacent downlink channel is compared against the lower threshold as in step 97. If $RF_2$ and $RF_3$ are less than the threshold $RF_{L/Thold}$, then the downlink power level on the backhaul channel can be decreased in step 100. If $RF_2$ and $RF_3$ are not less than the threshold $RF_{L/Thold}$, then the system proceeds to step 98.

In step 98, a comparison is made between the noise and interference signal power level that was measured in step 93, and a co-channel upper power threshold, which is preferably defined relative to $RF_1$. For example, the co-channel upper threshold can be selected to be −9 dBc, that is, −9 dB relative to the carrier. If the measured noise and interference levels on the downlink channel of the backhaul link are greater than the upper threshold, then the power level on the downlink channel of the backhaul link is increased as illustrated in step 101. If the measured noise and interference levels on the downlink channels of the backhaul link are not greater than the co-channel upper threshold, then the measured levels are compared to a co-channel lower threshold as illustrated in step 99. The co-channel lower threshold is preferably defined relative to $RF_1$. For example, this lower threshold can be selected to be 9 dBc. If the measured noise and interference levels are less than the co-channel lower threshold, then the power levels on the downlink channel of the backhaul link are decreased as illustrated in step 100. Otherwise, the adjustment then ends as shown in step 102.

It should readily be understood that the uplink channel could be tested in a similar manner as described for the downlink channel. To achieve this, the signals would originate at the repeater station and would be measured at the BTS. The measurement would be carried out in the same manner as done with the downlink measurement. Once the measurements are done, the power levels of signals transmitted over the backhaul link can be increased or decreased accordingly.

While exemplary systems and methods embodying the present invention are shown by way of example, it will be understood that the invention is not limited to these embodiments. Modifications can be made by those skilled in the art, particularly in light of the foregoing teachings. For example, each of the elements of the aforementioned embodiments may be utilized alone or in combination with elements of the other embodiments.

What is claimed is:

1. In a wireless communication system having a base station located within a home cell, and a plurality of substantially adjacent cells, at least one of said plurality of cells having a repeater station located therein, a method for diagnosing a backhaul communication link between said base station and said repeater, comprising:
   automatically measuring an interference level for said backhaul communication link by
   (a) temporarily disabling signal transmissions on said backhaul link, and
   (b) measuring at least one of a noise level and an interfering signal level on an RF carrier frequency of a backhaul channel assigned for said backhaul communication link; and
   responsive to said measured interference level, selectively modifying the operation of said backhaul link to overcome any adverse effect of said interference level by at least one of increasing a power level of signals transmitted over said backhaul link, decreasing said power level of signals transmitted over said backhaul link, assigning an alternative frequency for use as said backhaul link, and sending a message to an operations maintenance center.

2. The method according to claim 1, wherein said measuring step further comprises, automatically measuring said interference level on at least one RF channel adjacent to said RF carrier frequency of said backhaul channel.

3. The method according to claim 1 wherein said measuring step further comprises transmitting a test signal on said RF carrier frequency of said backhaul channel and measuring an adverse effect of at least one of a noise level and an interfering signal level on said test signal.

4. The method according to claim 3, wherein said adverse effect is measured by determining at least one of a carrier-to-noise level, a carrier-to-interference level, a bit error rate, and a block error rate.

5. The method according to claim 1, wherein said measuring step is performed in accordance with at least one of a predetermined interval, upon detection of a predetermined number of detected bit errors, upon detection of a predetermined number of detected block errors, and upon detection of a predetermined number of frame erasures.

6. In a wireless communication system having a base station located within a home cell, and a plurality of substantially adjacent cells, at least one of said plurality cells having a repeater station located therein, a system for diagnosing a backhaul communication link between said base station and each of said repeater, comprising:
   interference measuring means for automatically measuring an interference level for said backhaul communication link, said interference measuring means including means for temporarily disabling signal transmissions on said backhaul link, and means for measuring at least one of a noise level and an interfering signal level on an RF carrier frequency of a backhaul channel assigned for said backhaul communication link; and
   link modification means responsive to said measured interference level for selectively modifying the operation of said backhaul link to overcome any adverse effect of said interference level, wherein said link modification means selectively modifies at least one of a power level of signals transmitted over said backhaul link, a frequency of said backhaul link, and a status message directed to an operations maintenance center.

7. The system according to claim 6, wherein said interference measuring means automatically measures said interference level on at least one downlink RF channel adjacent to said RF carrier frequency of said backhaul channel.

8. The system according to claim 6, wherein said interference measuring means further comprises means for transmitting a test signal on said RF carrier frequency of said backhaul channel and means for measuring an adverse effect of at least one of a noise level and an interfering signal level on said test signal.

9. The system according to claim 8, wherein said adverse effect is measured by determining at least one of a carrier-to-noise level, a carrier-to-interference level, a bit error rate, and a block error rate.

10. The system according to claim 6, further comprising means for performing said measuring at one of a predetermined interval, upon detection of a predetermined number of detected bit errors, upon detection of a predetermined number of detected block errors, and upon detection of a predetermined number of frame erasures.

11. In a wireless communication system having a base station located within a home cell, and a plurality of substantially adjacent cells, at least one of said plurality of cells having a repeater station located therein, a method for diagnosing a backhaul communication link between said base station and said repeater, comprising:
   temporarily disabling signal transmissions on said backhaul communication link upon detection of at least one condition selected from the group consisting of a predetermined interval, a predetermined number of detected bit errors, a predetermined number of detected block errors, and a predetermined number of frame erasures;
   automatically measuring an interference level for said backhaul communication link when said backhaul link is temporarily disabled; and
   responsive to said measured interference level, selectively modifying the operation of said backhaul link to overcome any adverse effect of said interference level.

12. In a wireless communication system having a base station located within a home cell, and a plurality of substantially adjacent cells, at least one of said plurality of cells having a repeater station located therein, a system for diagnosing a backhaul communication link between said base station and each of said repeater, comprising:

backhaul disabling means for automatically temporarily disabling communication over said backhaul communication link responsive to detection of at least one condition selected from the group consisting of a predetermined interval, a predetermined number of detected bit errors, a predetermined number of detected block errors, and a predetermined number of frame erasures;

interference measuring means for automatically measuring an interference level on said backhaul communication link responsive to said backhaul disabling means; and link modification means responsive to said interference measuring means for selectively modifying the operation of said backhaul link to overcome any adverse effect of said interference level.

* * * * *